United States Patent

Hoshino et al.

Patent Number: 5,430,500
Date of Patent: Jul. 4, 1995

[54] THREE-DIMENSIONAL MOTION DETECTION

[75] Inventors: Takaya Hoshino, Saitama; Hiroyuki Kita; Toshio Sarugaku, both of Chiba; Mamoru Kanou, Kanagawa, all of Japan

[73] Assignee: Sony Corporation, Tokyo, Japan

[21] Appl. No.: 237,155

[22] Filed: May 3, 1994

[30] Foreign Application Priority Data

May 14, 1993 [JP] Japan .................. 5-113062

[51] Int. Cl.⁶ ............................................. H04N 7/18
[52] U.S. Cl. ................... 348/701; 348/702; 348/666
[58] Field of Search ........ 348/665, 666, 670, 696-702; H04N 7/18

[56] References Cited

FOREIGN PATENT DOCUMENTS

2376330 7/1990 WIPO .................. H04N 9/78

Primary Examiner—Victor R. Kostak
Attorney, Agent, or Firm—Jay H. Maioli

[57] ABSTRACT

A motion detector detects a motion of a video signal by a simple circuit arrangement with high accuracy. The motion detector comprises a first luminance detecting means (42) for detecting a luminance component contained in a composite video signal, a delay circuit (44) for delaying the composite video signal by at least one frame, a second luminance detecting means (45) for detecting a luminance component contained in a signal delayed by the delay circuit (44), a subtracting means (43) for subtracting a luminance component output from the first luminance detecting means (42) and a luminance component output from the second luminance detecting means (45) from each other, a filter (60) for eliminating a frequency band of a color subcarrier from an output of the subtracting means (43), a switching means (50) for selecting an output of the filter (60) and an output of the subtracting means (43) and a chroma component detecting means (50) for detecting a chroma component from the composite video signal, wherein the switching means (46) is controlled on the basis of a chroma component detected by the chroma component detecting means (50) and a motion detection is carried out on the basis of the level of a signal selected by the selecting means (46). A television receiver having a motion detector for a video signal is also provided.

16 Claims, 5 Drawing Sheets

THREE-DIMENSIONAL MOTION DETECTION

BACKGROUND OF THE INVENTION

1. Field of the Invention

The present invention relates to a motion detector for use in a luminance/chroma separator which separates a composite video signal to provide a luminance signal and a chroma signal, for example.

2. Description of the Related Art

Television receivers include a luminance/chroma separator to separate a composite video signal to provide a luminance signal and a chroma signal.

Figure 1:
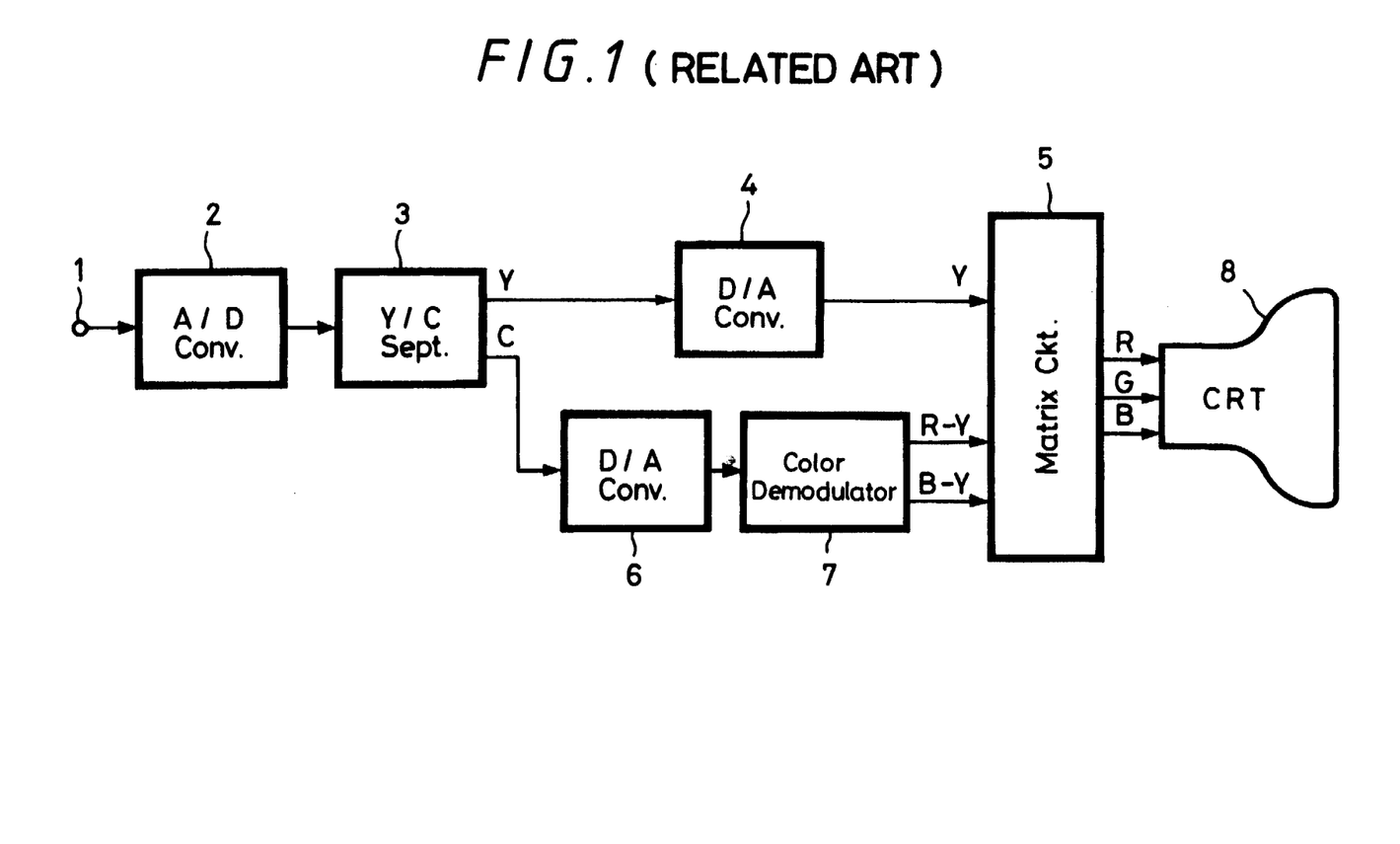
FIG. 1 is a schematic block diagram showing an example of a television receiver.

FIG. 1 of the accompanying drawings shows in block form a circuit arrangement of a television receiver. As shown in FIG. 1, a composite video signal applied to an input terminal 1 is converted by an analog-to-digital (A/D) converter 2 to a digital composite video signal. The digital composite video signal from the A/D converter 2 is supplied to a luminance/chroma (Y/C) separator 3. The luminance/chroma separator 3 detects and separates the digital composite video signal supplied thereto by using a correlation between adjacent horizontal lines of each field and a correlation between the frames to provide a luminance signal Y and a chroma signal C.

The digital luminance signal Y from the luminance/chroma separator 3 is converted by a digital-to-analog (D/A) converter 4 to an analog luminance signal and supplied to a matrix circuit 5. The digital chroma signal C from the luminance/chroma separator 3 is converted by a D/A converter 6 to an analog chroma signal and supplied to a color demodulator 7. The color demodulator 7 demodulates the analog chroma signal supplied thereto to provide color difference signals R-Y and B-Y. The color difference signals R-Y, B-Y from the color demodulator 7 are supplied to the matrix circuit 5. The matrix circuit 5 processes the luminance signal Y and the color difference signals R-Y, B-Y supplied thereto to provide three primary color signals R (red), G (green), B (blue) and supplies these color primary color signals R, G, B to a cathode ray tube (CRT) 8 which then displays a color image on its picture screen.

Figure 2:
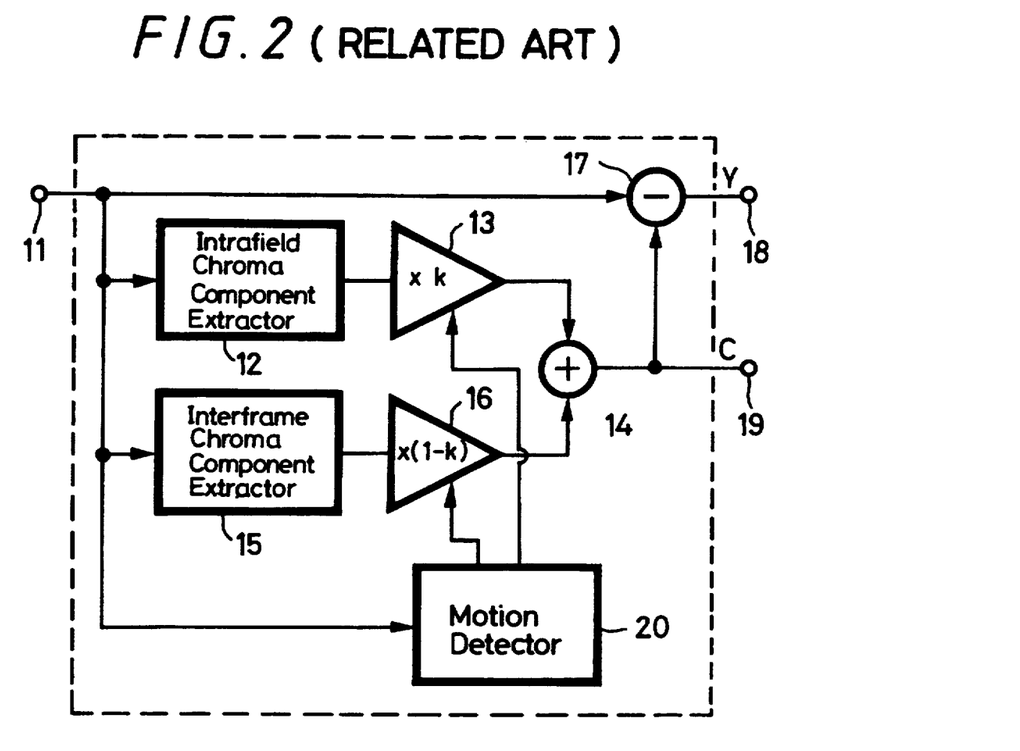
FIG. 2 is a schematic block diagram showing an example of a motion adaptive type luminance/chroma separator according to the related art.

The luminance/chroma separator used in the television receiver will be described more fully with reference to FIG. 2. In FIG. 2, reference symbol 10 generally depicts a luminance/chroma separator. The luminance/chroma separator 10 is what might be called a motion adaptive type luminance/chroma separator for changing the processing of an extracted chroma signal in accordance with a motion of a video signal. In the motion adaptive type luminance/chroma separator 10, as shown in FIG. 2, a composite video signal applied to an input terminal 11 is supplied to an intrafield chroma component extractor 12. The intrafield chroma component extractor 12 extracts a chroma component by using a correlation between adjacent lines of a video signal of each field, and supplies an extracted chroma component through a coefficient multiplier (x k) 13 to an adder 14. The coefficient multiplier 13 multiplies the chroma component with a coefficient k ($0 \leq k \leq 1$) supplied thereto from a motion detector 20 which will be described later on.

Also, the composite video signal applied to the input terminal 11 is supplied to an interframe chroma component extractor 15. The interframe chroma component extractor 15 extracts a chroma component by using a correlation between video signals of the same line of the frames, and supplies an extracted chroma component to the adder 14 through a coefficient multiplier (x (1-k)) 16. The coefficient multiplier 16 multiplies the chroma component with a coefficient (1-k) supplied thereto from the motion detector 20.

The adder 14 adds the chroma components extracted by the chroma component extractors 12, 15 and supplies an added chroma component to a subtracter 17. The subtracter 17 is supplied with the composite video signal from the input terminal 11 and subtracts the chroma component outputted from the adder 14 from this composite video signal. Then, the subtracter 17 supplies a subtracted signal to an output terminal 18 as the luminance signal Y and also supplies the chroma component outputted thereto from the adder 14 to an output terminal 19 as the chroma signal C.

Figure 3:
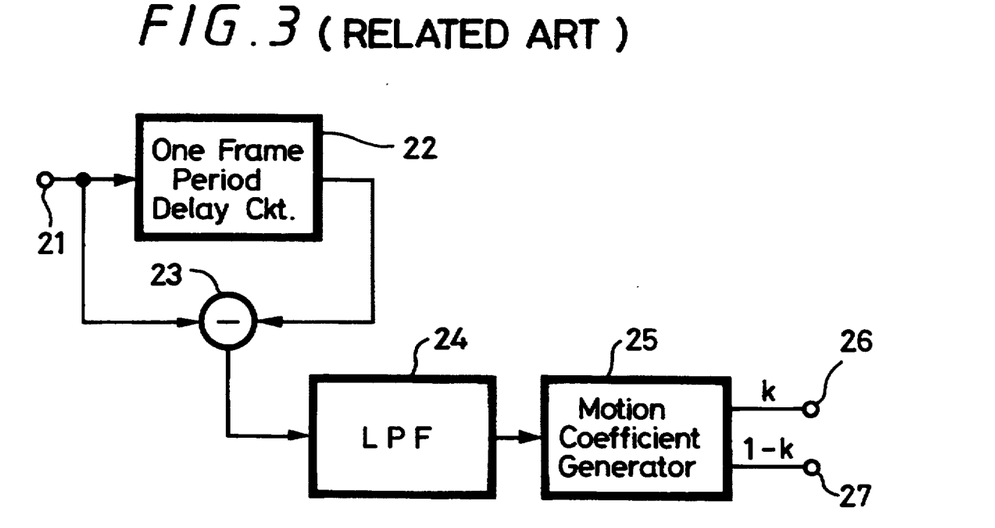
FIG. 3 is a schematic block diagram showing an example of a motion detector according to the related art.

The composite video signal applied to the input terminal 11 is supplied to the motion detector 20, and the motion detector 20 detects a motion of a picture represented by the composite video signal. A circuit arrangement of the motion detector 20 will be described with reference to FIG. 3, for example. As shown in FIG. 3, a composite video signal applied to an input terminal 21 is supplied to a one frame period delay circuit 22, and a subtracter 23 subtracts a signal delayed by the one frame period delay circuit 22 and the composite video signal directly supplied thereto from each other. When a difference between the frames of the video signal is obtained by the subtracter 23, if a picture represented by the video signal has a motion, then the subtracter 23 outputs a signal of the level corresponding to a motion amount as a frame difference signal. The frame difference signal is supplied to a low-pass filter (LPF) 24. The low-pass filter 24 eliminates a color subcarrier frequency band (i.e., frequency band near 3.58 MHz) and supplies its output to a motion coefficient generator 25. The motion coefficient generator 25 judges the motion amount on the basis of the frame difference signal supplied thereto, and generates coefficients k and (1-k) corresponding to the judged motion amount. Then, the motion coefficient generator 25 supplies the coefficients k and (1-k) through output terminals 26, 27 to the coefficient multipliers 13, 16 (see FIG. 2).

The coefficient k corresponding to the motion amount is set to 0 (k=0) if it is determined that a picture has no motion at all (i.e., a still image), and the coefficient k is set to 1 (k=1) if it is determined that a picture has a large motion amount. The coefficient k is set to an intermediate value ranging from 0 to 1 in response to a motion amount obtained at that time when a picture has an intermediate motion amount.

The coefficients k are changed as described above. Therefore, if a picture has no motion amount and the coefficient k is 0 (k=0), then the coefficient 0 is set to the coefficient multiplier 13 and the chroma component extracted by the intrafield chroma component extractor 12 is not supplied to the adder 14 at all. Also, the coefficient 1 is set to the coefficient multiplier 16 and the chroma component extracted by the interframe chroma component extractor 15 is supplied to the adder 14 as it is. Accordingly, under the condition that the picture has no motion amount, the adder 14 outputs only the chroma component extracted by the interframe chroma component extractor 15 so that the chroma component used by the subtracter 17 to generate the luminance signal and the chroma signal output from the output terminal 19 are only the chroma component extracted on the basis of the correlation between the frames of the video signal.

Conversely, if a picture has a large motion amount and the coefficient k is set to 1 (k=1), then the coefficient 1 is set to the coefficient multiplier 14 and the chroma component extracted by the intrafield chroma component extractor 12 is supplied to the adder 14 as it is. Also, the chroma component extracted by the interframe chroma component extractor 15 is not supplied to the adder 14 at all. Accordingly, under the condition that a picture has a large motion amount, the adder 14 outputs only the chroma component extracted on the basis of the correlation within one field of the video signal, and the chroma component used by the subtracter 17 to generate the luminance signal and the chroma signal output from the output terminal 18 are only the chroma component extracted from the video signal of one field.

If it is determined that a picture has a small amount of motion, then the coefficient k is set to the intermediate value ranging from 1 to 0 so that the adder 14 adds the chroma component extracted by the intrafield chroma component extractor 12 and the chroma component extracted by the interframe chroma component extractor 15 with a proper adding ratio. Therefore, the chroma component used to generate the luminance signal and the outputted chroma signal become such ones that result from mixing the two chroma components with a proper mixing ratio.

The luminance signal Y and the chroma signal C separated from the composite video signal are output from the output terminals 18, 19, whereby the luminance signal and the chroma signal are separated satisfactorily in response to the motion of the picture represented by the video signal. Specifically, if a picture has a small amount of motion, then the processing that mainly uses the chroma component extracted on the basis of the correlation of pictures provided between the frames is carried out and the separation processing with high accuracy suitable for a still image is carried out. If a picture has a large motion amount, then the processing that mainly uses the chroma component in which the extracting processing is completed at every field is carried out and the satisfactory separation processing following the motion of the picture is carried out.

Figure 4:
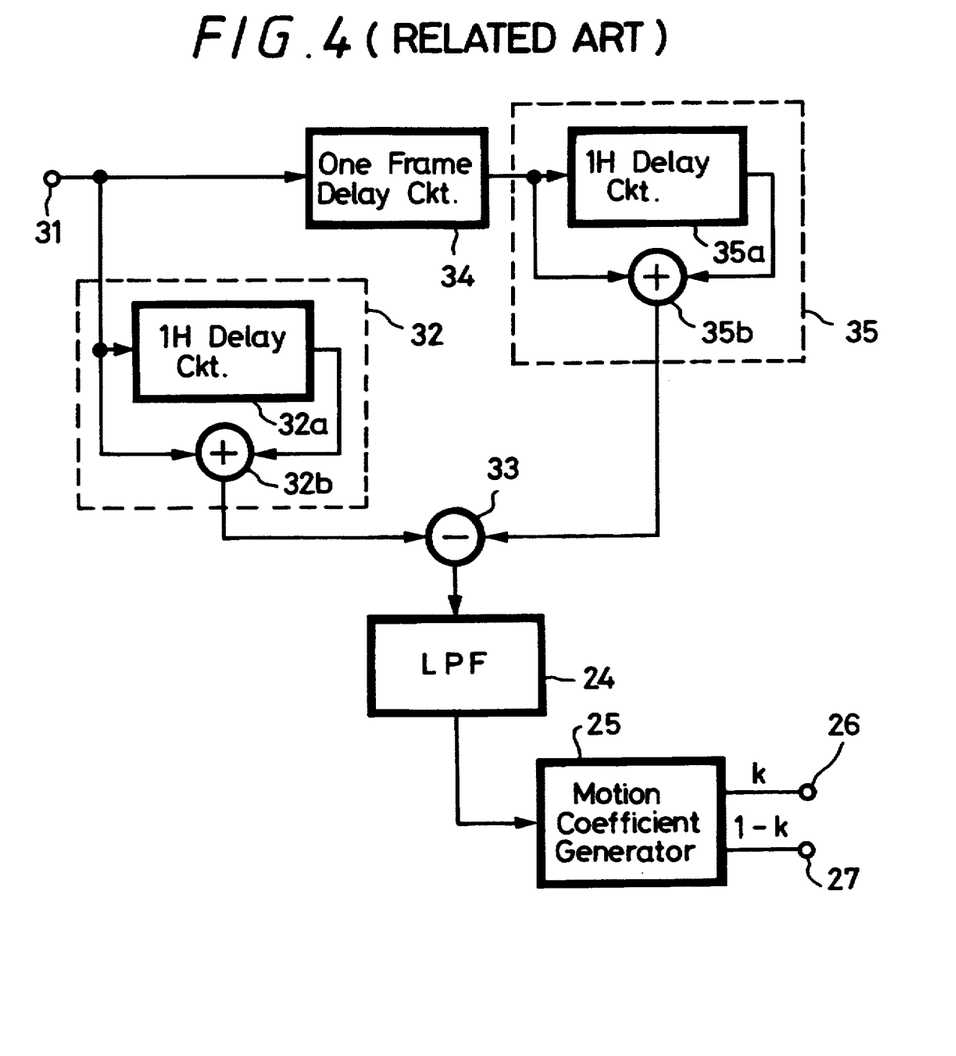
FIG. 4 is a schematic block diagram showing another example of a motion detector according to the related art.

Alternatively, the motion detector shown in FIG. 3 may be replaced with a motion detector shown in FIG. 4. As shown in FIG. 4, a composite video signal applied to an input terminal 31 is supplied to a luminance component extracting comb filter 32. In the comb filter 32, an adder 32b adds a signal delayed by a delay circuit 32a by 1H (one horizontal line) period and a signal, which is not delayed by the delay circuit 3a, to provide a luminance component. The luminance component obtained by the comb filter 32 is supplied to a subtracter 33. The composite video signal applied to the input terminal 31 is also delayed by a delay circuit 34 by a one frame period, and the delayed composite video signal is supplied to a luminance component extracting comb filter 35. Also, in the luminance component extracting comb filter 35, an adder 35b adds a signal delayed by a delay circuit 35a by 1H period and a signal, which is not delayed by the delay circuit 35a, to provide a luminance component. The luminance component obtained by the comb filter 35 is supplied to the subtracter 33.

The subtracter 33 subtracts the luminance component of the video signal preceding one frame from the luminance component of the video signal of the present frame to provide a difference signal, and supplies the difference signal to the low-pass filter 24. A rest of the circuit arrangement shown in FIG. 4 is the same as that of the motion detector shown in FIG. 3. Specifically, the low-pass filter 24 eliminates the frequency band of the color subcarrier. The output of the low-pass filter 24 is supplied to the coefficient generator 25 which generates the coefficients K and (l-k) corresponding to the judged motion amounts. Then, the coefficients k and (l-k) are supplied from the output terminals 26, 27 to the coefficient multipliers 13, 16 (see FIG. 2).

The motion detector shown in FIG. 4 can generate the coefficient k and (l-k) corresponding to the motion amounts similar to the motion detector shown in FIG. 3.

Although the motion detector shown in FIG. 3 includes the low-pass filter 24 to eliminate the chroma component contained in the frequency band of the color subcarrier from the composite video signal, if the chroma component is eliminated by the low-pass filter 24, then a high band component of the luminance component contained in the component video signal is also eliminated by the low-pass filter 24. If the high band component (i.e., information representing a small picture pattern portion of an image) of the luminance component is eliminated, then only the low frequency component (i.e., information representing a comparatively large picture pattern of an image) is supplied to the motion coefficient generator 25 as a motion signal and a high frequency motion component is not supplied thereto. Therefore, a moving picture having a small picture pattern (e.g., image representing that cross stripes are being moved) cannot be detected as a motion of a video signal.

If the moving picture with a small picture pattern were not detected, then the above-mentioned motion adaptive type luminance/chroma separator would separate the composite video signal by using the chroma component extracted by the interframe chroma extractor 15 to provide the luminance signal and the chroma signal even though an image is a moving picture, thereby deteriorating the picture quality.

On the other hand, since the motion detector shown in FIG. 4 carries out the motion detection after the luminance component extracting comb filters 32, 34 extracted only the luminance component, the low-pass filter 24 may be removed. However, in a picture in which a color is changed in the vertical direction, a chroma component is leaked to the outputs of the comb filters 32, 34 and therefore the low-pass filter 24 is also required. Thus, similar to the motion detector shown in FIG. 3, the low-pass filter 24 eliminates the high band component of the luminance signal and the motion detector shown in FIG. 4 cannot detect a moving image with a small picture pattern as a motion of a video signal.

While the motion detector required when the composite video signal is separated to provide the luminance signal and the chroma signal has been described so far, a motion detector required to effect other video signal processing encounters with similar shortcomings and disadvantages.

OBJECTS AND SUMMARY OF THE INVENTION

It is therefore an object of the present invention to provide an improved motion detector in which the aforesaid shortcomings and disadvantages encountered with the prior art can be eliminated.

It is another object of the present invention to provide a motion detector of a simple circuit arrangement which can detect a motion of a video signal accurately.

According to an aspect of the present invention, there is provided a motion detector for a video signal which is comprised of a first luminance detecting means for detecting a luminance component contained in a composite video signal, a delay circuit for delaying the composite video signal by at least one field, a second luminance detecting means for detecting a luminance component contained in a signal delayed by the delay circuit, a subtracting means for subtracting a luminance component output from the first luminance detecting means and a luminance component output from the second luminance detecting means from each other, a filter for eliminating a frequency band of a color subcarrier from an output of the subtracting means, a switching means for selecting an output of the filter and an output of the subtracting means, a chroma component detecting means for detecting a chroma component from the composite video signal and a control circuit for controlling the switching means on the basis of the level of a chroma component detected by the chroma component detecting means and carrying out a motion detection on the basis of a level of a signal selected by the switching means.

According to the present invention, the first and second luminance detecting means are comb filters, each formed of a delay circuit for delaying a signal by one horizontal line and an adding circuit for adding a signal delayed by the delay circuit and a signal which is not delayed.

Further, according to the present invention, the level of the chroma component detected by the chroma component detecting means is compared with a predetermined threshold value, and the switching means selects the output of the filter when the level of the detected chroma component is higher than the threshold value.

According to the present invention, the interposed condition of the filter is changed depending on the portions where the chroma component is contained in the composite video signal supplied and on the portions is not contained in the composite video signal supplied, thereby obtaining a luminance difference signal having proper frequency bands corresponding to respective conditions. It become possible to carry out a satisfactory motion detection by the luminance difference signals having proper frequency bands.

Further, since the comb filters are used as the first and second luminance detecting means, the luminance components can be detected with high accuracy.

Furthermore, the level of the chroma component detected by the chroma component detecting means is compared with the predetermined threshold value and the outputs of the filters are selected by the selecting means when the level of the detected chroma component is higher than the threshold value. Therefore, the motion detector can be prevented from malfunctioning by a noise contained in the chroma component.

According to a second aspect of the present invention, there is provided a television receiver having a motion detector for a video signal which is comprised of a separating circuit for separating a composite video signal to provide a luminance component and a chroma component, a first luminance detecting means for detecting a luminance component contained in the composite video signal, a delay circuit for delaying the composite video signal by at least one frame, a second luminance detecting means for detecting a luminance component contained in a signal delayed by the delay circuit, a subtracting means for subtracting a luminance component output from the first luminance detecting means and a luminance component output from the second luminance detecting means from each other, a filter for eliminating a frequency band of a color subcarrier from an output of the subtracting means, a switching means for selecting an output of the filter and an output of the subtracting means, a chroma component detecting means for detecting a chroma component from the composite video signal, and a control circuit for controlling the switching means on the basis of the level of a chroma component detected by the chroma component detecting means and carrying out a motion detection on the basis of a level of a signal selected by the switching means.

The above and other objects, features, and advantages of the present invention will become apparent from the following detailed description of an illustrative embodiment thereof to be read in conjunction with the accompanying drawings.

DETAILED DESCRIPTION OF THE PREFERRED EMBODIMENT

A motion detector according to an embodiment of the present invention will now be described with reference to FIGS. 5 through 7.

According to this embodiment, the motion adaptive type luminance/chroma separator 10 shown in FIG. 2 provided as the related art is applied to a motion detector. According to this embodiment, the motion adaptive type luminance/chroma separator separates a digital composite video signal obtained in the form of digital data when the NTSC composite video signal is processed by a sampling frequency of 4 fsc (fsc is a color subcarrier frequency) to provide a luminance signal and a chroma signal.

A circuit arrangement of the motion detector according to this embodiment will be described below. As shown in FIG. 5, a composite video signal (digital signal) is applied to an input terminal 41. The composite video signal applied to the input terminal 41 is supplied to a luminance component extracting comb filter 42. In the comb filter 42, an adder 42b adds a signal delayed by a delay circuit 42a by 1H period and a signal, which is not delayed by the delay circuit 4a, to provide a luminance component. The luminance component obtained by the comb filter 42 is supplied to a subtracter 43. The composite video signal applied to the input terminal 41 is delayed by a delay circuit 44 by one frame period, and the delayed composite video signal is supplied to a luminance component extracting comb filter 45. Also in the luminance component extracting comb filter 45, an adder 45b adds a signal delayed by a delay circuit 45a by 1H period and a signal, which is not delayed by the delay circuit 45a, to provide a luminance component. The luminance component obtained by the comb filter 45 is supplied to the subtracter 43.

The subtracter 43 subtracts the luminance component of the video signal preceding one frame from the luminance component of the video signal of the present frame. A difference signal obtained by the subtracter 43 is supplied to a first fixed contact 46a of a change-over switch 46 through a low-pass filter (LPF) 60, and is also supplied to a second fixed contact 46b of the change-over switch 46 bypassing the low-pass filter 60. The low-pass filter 60 is to eliminate a frequency band of a color subcarrier and is arranged as shown in FIG. 6.

Figure 6:
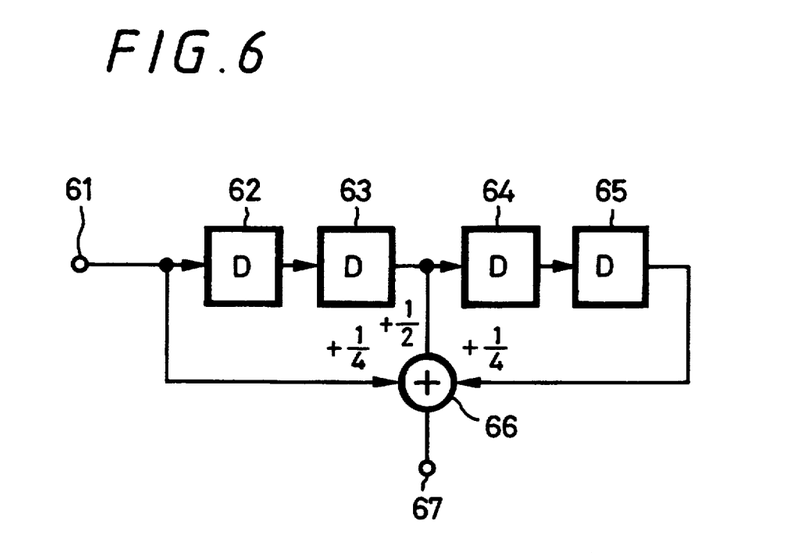
FIG. 6 is a schematic block diagram showing a low-pass filter used in the embodiment of the present invention.
Figure 7:
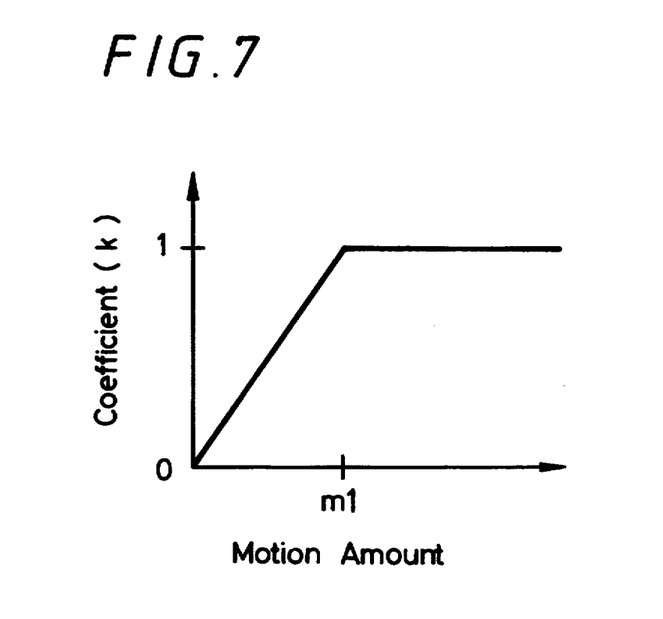
FIG. 7 is a characteristic graph used to explain the condition that a motion coefficient is generated by the motion detector according to the embodiment of the present invention.

As shown in FIG. 6, the signal (difference signal from the subtracter 43) applied to an input terminal 61 is supplied to four delay circuits (D) 62, 63, 64, 65 connected in series. Each of the delay circuits 62, 63, 64 and 65 is to delay an input signal (digital signal) by one sample each. The difference signal applied to the input terminal 61, a difference signal output from the delay circuit 63, and a difference signal output from the delay circuit 65 are added by an adder 66. The adder 66 adds the signal directly supplied thereto from the input terminal 61 with an adding ratio of $+(\frac{1}{4})$, the output of the delay circuit 63 with an adding ratio of $+(\frac{1}{2})$ and the output of the delay circuit 65 with an adding ratio of $+(\frac{1}{4})$. An added output of the adder 66 is supplied to an output terminal 67. The low-pass filter which eliminates the band of the color subcarrier frequency fsc serving as the frequency containing the chroma component is constructed by the above-mentioned adding. The reason that the circuit arrangement shown in FIG. 6 can achieve the above-mentioned characteristic is that digital data to be processed has a sampling frequency of 4 times (i.e., 4 fsc) the color subcarrier frequency fsc.

The change-over switch 46 connected to the next stage of the low-pass filter 60 selectively connects its movable contact 46m to the first or second fixed contact 46a or 46 under control of an output from a chroma component detector 50 which will be described later on. A difference signal of a luminance component developed at the movable contact 46m of the change-over switch 46 is supplied to a motion coefficient generator 47. The motion coefficient generator 47 judges the motion amount of the video signal from the difference signal of the luminance component supplied thereto and generates coefficients k and (l-k) corresponding to the judged motion amount. The coefficients k and (l-k) thus generated are output from output terminals 48, 49. The coefficients k and (l-k) output from the output terminals 48, 49 are supplied to coefficient multipliers (corresponding to the coefficient multipliers 13, 16 shown in FIG. 2) of the luminance/chroma separator, in which they are multiplied with each other.

The coefficient k corresponding to the motion amount is set to 0 (k=0) if it is determined that a picture has no motion (still image), set to 1 (k=1) if it is determined that a picture has a large motion amount, and is set to an intermediate value ranging from 0 to 1 if it is determined that a picture has an intermediate motion amount.

The condition that the coefficients k and (l-k) are generated will be described below. As shown in FIG. 7, the value of the coefficient k increases in substantially a straight line fashion up to a value ml of a certain motion amount. When the motion amount exceeds the value ml, the coefficient k is set to 1 (i.e., (l-k) is set to 0). The coefficient value is successively changed at every pixel of a supplied video signal.

The mixing ratio of the chroma component extracted by the intrafield chroma component extractor 12 and the chroma component extracted by the interframe chroma component extractor 15 is set by setting the coefficient k in response to the motion of an image. Therefore, the luminance/chroma separator functions as the motion adaptive type luminance/chroma separator.

According to this embodiment, the change-over switch 46 can select a signal processed by the low-pass filter (LPF) 60 and a signal, which is not processed by the low-pass filter 60, as the difference signal of the luminance component to be supplied to the motion coefficient generator 47. An arrangement for selecting the above two signals will be described.

Figure 5:
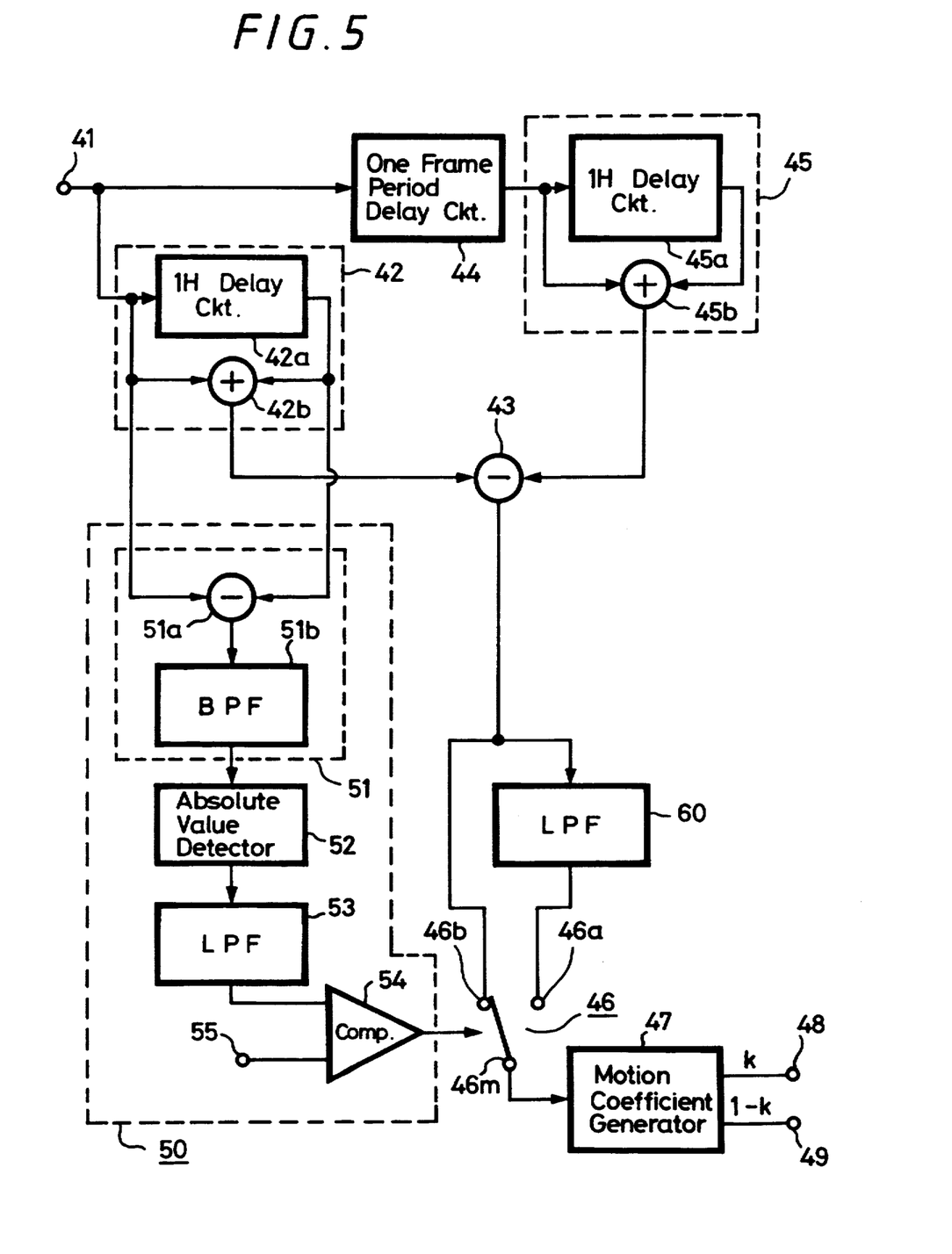
FIG. 5 is a block diagram showing a motion detector according to an embodiment of the present invention.

As shown in FIG. 5, the signal delayed by the delay circuit 42a forming the luminance component extracting comb filter 42 by 1H period and the signal, which is not delayed by the delay circuit 4a, are supplied to the chroma component extractor 50. The chroma component extractor 50 supplies the two signals to the chroma component extracting comb filter 51 which extracts the chroma component. Specifically, the subtracter 51a subtracts the 1H delayed signal and the signal, which is not delayed, both of which are supplied to the chroma component extracting comb filter 51, from each other to detect a difference therebetween. Then, the subtracter 51a supplies a detected difference signal to a bandpass filter (BPF) 51b. The bandpass filter 51b passes a chroma component band (i.e., frequency band of color subcarrier fsc), and an output of the bandpass filter 51b is supplied to an absolute value detector 52 as an output of the chroma component extracting comb filter 51.

The absolute value detector 52 detects an absolute value of the chroma signal supplied thereto and supplies data representing a detected absolute value through a low-pass filter (LPF) 53 to a comparator (COMP) 54 which receives a signal of a predetermined threshold value from a threshold value input terminal 55. The comparator 54 determines whether or not the absolute value of the chroma signal is higher than the threshold value. When the absolute value of the chroma signal is higher than the threshold value, the comparator 54 outputs a signal (e.g., high level signal, etc.) representing that the absolute value of the chroma signal is higher than the threshold value. The threshold value signal may be supplied to the threshold value input terminal 55 from a controller (not shown) of a television receiver which incorporates this motion detector, for example. Thus, a proper threshold value may be set for every video equipment.

The output of the comparator 54 is supplied to the change-over switch 46 as the output of the chroma component detector 50 to thereby control the switching of the movable contact 46m.

More specifically, when the comparator 54 detects the chroma signal whose level is higher than the threshold value, the change-over switch 46 connects the movable contact 46m to the first fixed contact 46a. When the comparator 54 cannot detect the chroma signal whose level is higher than the threshold level, the change-over switch 46 connects the movable contact 46m to the second fixed contact 46b. Accordingly, when the chroma component detector 50 detects the chroma signal of level higher than the threshold value, the signal whose chroma component was eliminated by the low-pass filter 60 is supplied to the coefficient generator 47. When, on the other hand, the chroma component detector 50 cannot detect the chroma signal of level higher than the threshold value, the signal, which is not processed by the low-pass filter 60, is supplied to the coefficient generator 47.

With the above-mentioned control, when the chroma component whose level is higher than a constant level is contained in the input video signal, similar to the motion detector (see FIGS. 3 and 4) according to the related art, a motion detection signal is generated on the basis of the signal from which the band (i.e., chroma component) of the subcarrier frequency fsc was eliminated by the low-pass filter 60. Therefore, the motion coefficient can satisfactorily be generated without being affected by the chroma component.

When the chroma component whose level is higher than the constant level is not contained in the input video signal, the signal supplied to the motion coefficient generator 47 is not processed by the low-pass filter 60 so that a signal having a band close to the subcarrier frequency fsc is supplied to the motion coefficient generator 47 as it is. Therefore, a high frequency component having a band close to the subcarrier frequency fsc is contained in the difference signal of the luminance component supplied to the motion coefficient generator 47 with the result that a motion coefficient can be generated on the basis of luminance components of all bands ranging from low to high frequencies. The processing for generating the motion detection signal is carried out when the original input video signal does not contain the chroma component substantially so that, unless the chroma component is eliminated by the low-pass filter 60, the processing for generating the motion detection signal is not disturbed by the chroma component substantially.

Since the motion coefficient can be generated on the basis of the luminance component of all bands, a motion of an image having a small picture pattern represented by a high frequency luminance component can be detected. Thus, even when an image has in its small picture pattern a motion, a corresponding motion coefficient can be generated. Therefore, the motion adaptive type luminance/chroma separator using this motion detector can process the input video signal to provide a luminance signal and a chroma signal in response to a motion of a video signal accurately.

The processing based on the luminance signal of wide band is carried out only when the chroma component is low in level, i.e., only in a portion (pixel) of an image which is substantially close to black and white picture. A video signal, transmitted in television broadcasting or the like in actual practice, has a lot of such portions (pixels). Therefore, the motion detector according to the present invention can considerably improve a picture quality when applied to video equipment, such as a television receiver or the like.

According to the embodiment of the present invention, since the chroma component detected by the chroma component detector 50 is compared with the threshold value, even when a noise is superimposed upon the chroma component, an influence of such noise can be eliminated. Therefore, it becomes possible to effect a satisfactory motion detection without disturbance by the noise.

The present invention is not limited to the circuit elements shown in the embodiment and the one frame period delay circuit 44 provided within the motion detector may also be used for a delay circuit within the luminance/chroma separator.

While the motion detector is used in the motion adaptive type luminance/chroma separator as described above, the present invention is not limited thereto and the motion detector according to the present invention may be applied to motion detectors of other video signal processors. By way of example, the motion detector according to the present invention may be applied to motion detectors that are required by a noise reducer for eliminating a noise from a video signal and a converting circuit for doubling a line frequency of a video signal or the like.

While an apparatus to which the luminance/chroma separator is applied was not described at all, the luminance/chroma separator is not limited to the television receiver described in the related art and may be applied to a variety of video equipment, such as a VTR (video tape recorder) and a video disk player, which require the processing for separating the luminance signal and the chroma signal.

Furthermore, while a motion of a video signal is detected from the NTSC digital composite video signal as described above, the present invention is not limited thereto and may, of course, be applied to circuits for detecting a motion of video signals according to the other systems.

As set out, according to the present invention, the difference signal of the luminance component of the proper band can be obtained by changing the inserted state of the filter for eliminating the chroma component depending on the portion in which the chroma component is contained in the supplied composite video signal and the portion in which the chroma component is not contained in the supplied composite video signal. Therefore, a motion of a video signal can satisfactorily be detected on the basis of the difference signal of the luminance component of the proper band.

Further, since the comb filters are used as the first and second luminance detecting means, the luminance component can be extracted with high accuracy and it becomes possible to detect a motion of a video signal with high accuracy.

Furthermore, since the level of the chroma component detected by the chroma component detecting means is compared with the predetermined threshold value and the outputs of the filters are selected by the switching means when the level of the chroma component is higher than the threshold value, the motion detector malfunctions due to a noise contained in the chroma component can be avoided.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A motion detector for a video signal comprising:
   first luminance detecting means for detecting a luminance component contained in a composite video signal;
   a delay circuit for delaying said composite video signal by at least one field;
   second luminance detecting means for detecting a luminance component contained in said composite video signal delayed by said delay circuit;
   subtracting means for subtracting a first luminance component output from said first luminance detecting means and a second luminance component output from said second luminance detecting means from each other;
   a filter for eliminating a frequency band of a color subcarrier from an output of said subtracting means;
   switching means for selecting an output of said filter and an output of said subtracting means;
   chroma component detecting means for detecting a chroma component contained in said composite video signal; and
   a control circuit for controlling said switching means on the basis of the level of the chroma component detected by said chroma component detecting means and carrying out a motion detection on the basis of the output selected by said switching means.

2. The motion detector according to claim 1, wherein said first and second luminance detecting means are comb filters, each formed of a delay circuit for delaying a signal by one horizontal line and an adding circuit for adding a signal delayed by said delay circuit and a signal which is not delayed.

3. The motion detector according to claim 1, wherein said control circuit includes means for comparing a level of said chroma component detected by said chroma component detecting means with a predetermined threshold value, and said switching means selects the output of said filter when the level of said detected chrome component is higher than said threshold value.

4. The motion detector according to claim 1, wherein said first and second luminance detecting means are comb filters, each formed of a delay circuit for delaying a signal by one horizontal line and an adding circuit for adding a signal delayed by said delay circuit and a signal which is not delayed, and said control circuit includes means for comparing a level of said chroma component detected by said chroma component detecting means with a predetermined threshold value and said switching means selects the output of said filter when said level of said detected chroma component is higher than said threshold value.

5. The motion detector according to claim 1, wherein said control circuit comprises a comparing circuit for comparing a level of the output of said chroma component detecting means and a predetermined level with each other and wherein said switching means is controlled on the basis of a compared result output from said comparing circuit.

6. The motion detector according to claim 5, wherein said control circuit further comprises an absolute value circuit for detecting an absolute value of the output signal of said chroma component detecting means and wherein said switching means is controlled by comparing output values of said absolute value circuit by said comparing circuit.

7. The motion detector according to claim 6, wherein said control circuit further comprises a low-pass filter for eliminating a high frequency component of the output signal of said absolute value circuit, an output result of said low-pass filter being input to said comparing circuit.

8. The motion detector according to claim 7, further comprising a motion coefficient generating circuit connected to an output of said switching means.

9. A television receiver having a motion detector for a composite video signal comprising:
   first luminance detecting means for detecting a luminance component contained in said composite video signal;
   a delay circuit for delaying said composite video signal by at least one field;
   second luminance detecting means for detecting a luminance component contained in the composite video signal delayed by said delay circuit;
   subtracting means for subtracting a first luminance component output from said first luminance detecting means and a second luminanos component output from said second luminance detecting means from each other;
   a filter for eliminating a frequency band of a color subcarrier from an output of said subtracting means;
   switching means for selecting an output of said filter and an output of said subtracting means;
   chroma component detecting means for detecting a chroma component from said composite video signal; and
   a control circuit for controlling said switching means on the basis of a level of the chroma component detected by said chroma component detecting means and carrying out a motion detection on the basis of a level of the output selected by said switching means.

10. The television receiver according to claim 9, wherein said first and second luminance detecting means are comb filters, each formed of a delay circuit for delaying a signal by one horizontal line and an adding circuit for adding a signal delayed by said delay circuit and a signal which is not delayed.

11. The television receiver according to claim 9, wherein said control circuit includes means for comparing a level of said chroma component detected by said chroma component detecting means with a predetermined threshold value, and said switching means selects the output of said filter when the level of said detected chroma component is higher than said threshold value.

12. The television receiver according to claim 9, wherein said first and second luminance detecting means are comb filters, each formed of a delay circuit for delaying a signal by one horizontal line and an adding circuit for adding a signal delayed by said delay circuit and a signal which is not delayed, and said control circuit includes means for comparing a level of said chroma component detected by said chroma component detecting means with a predetermined threshold value and said switching means selects the output of said filter when said level of said detected chroma component is higher than said threshold value.

13. The television receiver according to claim 9, wherein said control circuit comprises a comparing circuit for comparing the output level of said chroma component detecting means and a predetermined level with each other and wherein said switching means is controlled on the basis of a compared result output from said comparing circuit.

14. The television receiver according to claim 13, wherein said control circuit further comprises an absolute value circuit for detecting an absolute value of the output signal of said chroma component detecting means and wherein said switching means is controlled by comparing output values of said absolute value circuit by said comparing circuit.

15. The television receiver according to claim 14, wherein said control circuit further comprises a low-pass filter for eliminating a high frequency component of the output signal of said absolute value circuit, an output result of said low-pass filter being input to said comparing circuit.

16. The television receiver according to claim 15, further comprising a motion coefficient generating circuit and a luminance signal/chroma signal separating circuit connected to the output of said switching means, said luminance signal/chroma signal separating circuit being controlled by a coefficient output of said motion coefficient generating circuit connected to an output of said switching means.

* * * * *

UNITED STATES PATENT AND TRADEMARK OFFICE
CERTIFICATE OF CORRECTION

PATENT NO. : 5,430,500
DATED : July 4, 1995
INVENTOR(S) : Takaya Hoshino, Hiroyuki Kita, Toshio Sarugaku, and Manoru Kanou It is certified that error appears in the above-identified patent and that said Letters Patent is hereby corrected as shown below:

On the title page:

Item [56] under References Cited, change "2376330" to --0376330--
Col. 3, line 54, change "3a" to --32a--
Col. 5, line 44, after "portions" insert --where it--

In the claims:

Col. 12, line 26, change "luminanos" to --luminance--

Signed and Sealed this

Twenty-seventh Day of August, 1996

Attest:

BRUCE LEHMAN

Attesting Officer     Commissioner of Patents and Trademarks